UNITED STATES PATENT OFFICE.

RUDOLF LANGHANS, OF BERLIN, GERMANY.

METHOD OF AND COMPOSITION FOR MAKING ARTIFICIAL SILK.

SPECIFICATION forming part of Letters Patent No. 571,530, dated November 17, 1896.

Application filed January 17, 1894. Serial No. 497,191. (No specimens.)

*To all whom it may concern:*

Be it known that I, RUDOLF LANGHANS, a subject of the Emperor of Germany, residing at Berlin, Kingdom of Prussia, German Empire, have invented certain new and useful Improvements in Methods of and Compositions for Making Artificial Silk, of which the following is a specification.

The present invention relates to and has for its object the production from carbohydrates of a viscid mass suitable for manufacturing therefrom silky filaments for use in textile industries.

The methods heretofore employed for producing the so-called "artificial" silks are based on the use of nitrocellulose or collodion, which require denitrating. All known methods of denitrating nitrocellulose when brought into the form of filaments have proved unserviceable for industrial application partly on account of the denitration reducing beyond an admissible limit the strength of the filament and partly on account of the denitration having a merely superficial effect. Since the nitro compounds are readily inflammable and subject to explosive decomposition by inflammation, their application for textile purposes must necessarily be a very narrow and limited one.

In my process I wholly abstain from the use of nitrocellulose both in the product to be acted upon and in the final product. It is by employing pure cellulose as well as other analogous carbohydrates converted into solution by means of hydrates of phosphoric and sulfuric acids that I have succeeded in obtaining a mass which leaves behind pure hydrated cellulose on being treated with appropriate liquid agents. For this purpose I subject cellulose or other analogous carbohydrates to a purifying process by first treating them with an aqueous solution of an alkali and then with an aqueous solution of hydrochlorin acid or sulfuric acid, and washing the so-treated cellulose with water until a neutral reaction is obtained and thereupon drying at a temperature of about 40° centigrade. The thus-prepared cellulose is impregnated for some time with diluted aqueous solutions of hydrated phosphoric and sulfuric acids or a mixture of such solutions. For instance, such as are obtained by the addition to an aqueous solution of phosphoric acid containing thirty-three per cent. of $P_2O_5$ of so much monohydrate of sulfuric acid that a liquor results which contains twenty per cent. of $H_2SO_4$. This compound liquor should be applied in such a proportion only as is sufficient for completely impregnating the cellulose, and it suffices to allow it to act till the fibers begin to swell. The mass is then treated with dihydrate of sulfuric acid $(H_2O_2)$ $SO_3$, with which it is kneaded together by the aid of a suitable kneading press or machine, whereby a more uniform action is obtained. When the mass has become homogeneous, it forms a viscid dough. To this dough is added pure concentrated hydrate of phosphoric acid and uniformly incorporated therein by kneading, whereby the dough is transformed into a glass-like transparent viscid syrup, which may be easily drawn into filaments.

In order to impart to the mass a greater stability as to its chemical composition, it is advantageous to produce in the same certain transformations, *i. e.*, such as result in retarding or preventing automatic conversion of the acid cellulose into dextrin or compounds of the sugar class, which might otherwise quickly occur. This effect may be obtained as follows:

First. The above product is kneaded together with compound ethers or esters, which ethyl alcohol or glycerin form with phosphoric, sulfuric, or nitric acid. These esters act on the acid cellulose present in such a manner as to split off acid with which they combine into ether acids.

Second. In lieu of said ethers or esters absolute alcohol may be used by introducing the same in small portions into the mass and quickly kneading the mixture until the mass takes the desired consistency.

Third. The desired transformation can also be brought about by kneading the product together with an aqueous phosphoric acid containing forty-five per cent. of $H_2PO_4$, whereby the dissolved acid celluloses present are split into less acid compounds, which are more stable and slower in changing condition.

Obviously the proportions of the various ingredients will vary with the nature of the cellulose treated, and according to the elasticity and strength desired in the threads or filaments to be obtained from the glass-like transparent viscid syrup.

In forming the threads or filaments any suitable apparatus may be used, the same forming no part of this invention.

The following is a preferred method: The above-obtained glass-like transparent viscid syrup is placed in suitable glass flasks provided each with a conical socket-piece, in the outer end of which is tightly fused a platinum plate having one or more minute bores therein, through which bores only the viscid mass can escape. A very fine acid-proof filter may be located in the socket-piece to collect any impurities in the mass and prevent clogging of the bores or openings.

A fine thread or filament may be obtained in one of two ways.

First. The thread-like streams, forced through the minute openings in the platinum plate by means of air-pressure, are discharged into a substantially neutral fluid medium, such as coal-tar, benzal, turpentine, benzene, or naptha, and are slightly hardened thereby, and so long as the thread or filament remains in such medium it retains its ductility and may be drawn or spun out. As the thread or filament is drawn or spun out from the neutral filament it is conducted through a bath of water, ether, alcohol, glycerin, or acetic acid, and is immediately hardened thereby, after which it may be attached to a rotating drum and wound thereon. The fineness of the continuous thread or filament will depend upon the velocity with which it is drawn through the neutral fluid medium. I prefer to have the hardening medium of such extent that no free acids shall be contained therein, and in order to more thoroughly and rapidly dehydrate and harden the filament before reaching the drum I interpose an alcohol bath and conduct the filament therethrough. In carrying out this method care must be taken that the amount of dilute phosphoric acid or the ethers added should not exceed half the weight of the entire viscous product previously obtained.

Second. The outlet of the flask containing the viscid mass leads directly into an aqueous bath to immediately strengthen and harden the filament in process of formation. The filament is then conducted successively through water and alcohol before it is wound or reeled to completely remove all acids. In this second method the amount of dilute phosphoric acid or the ethers should equal the weight of the previously-obtained viscous product.

Filaments produced in accordance with this invention are colored blue in a solution of amylum mixed with potassium iodid. They readily dissolve in cupro ammonia and swell when treated with water. Exposed to the action of heat they smell, with separation of carbon, as sugar does, and on being burned they smell as burning sugar does.

If it is desired to render the threads or filaments incombustible, an alcoholic solution of boracic acid may be substituted for the bath of pure alcohol, whereby the gelatinous thread or filament will become impregnated with boracic acid or the borates, which by the evaporation of the alcohol will remain incorporated in the filament with the result that it will not burn or even glow slightly when exposed to high temperature.

If desirable, the thread or filament can be dyed with fast colors by drawing it through an alcoholic color bath before it has been hardened by drying, and the said color bath may be an independent one or the alcohol bath hereinbefore referred to may serve a double purpose by dissolving the coloring-matter therein.

The coal-tar dyes may be used, among others, to provide the coloring-matter, and as the gelatinous thread or filament is permeated throughout its entire section by the alcohol the dissolved color is thus deposited within the substance of the thread, and it is best to use a very weak color bath, as the subsequent drying thickens the thread and intensifies the color. Great stability of color is thus insured, while the gloss of the thread is not in the least diminished, nor is the thread injured in any way, contrary to the results obtained by the usual methods of dyeing with their necessary accompanying mordanting.

The thread or filament which I have herein described may be rendered impervious to water by being drawn through a weak aqueous solution of alum while it is in a gelatinous condition and then through a soap solution, whereby an oleate of aluminium is formed in the thread, which latter, after drying, is waterproof. A solution of oleate of aluminium in turpentine may be used for the same purpose, the thread being drawn therethrough while it is gelatinous.

If it is desired to increase the luster of the thread and its insolubility in water, it may in its finished state be passed through a bath of potassium-chromium gelatin dissolved in water, the thin coating of the solution formed on the thread when dry leaving a delicate highly lustrous deposit thereon which is insoluble in water.

I am well aware that various devices for forming filaments from a viscid mass have been heretofore employed, and in indicating a preferred method of obtaining my filaments I claim no novelty in the apparatus, consisting, essentially, of a flask with a socket-piece having a platinum plate therein pierced with a fine orifice or orifices.

I claim—

1. The herein-described method of producing non-inflammable artificial silk from cellulose and other analogous carbohydrates, which consists in purifying the said material, subjecting the purified material to the action of phosphosulfuric, sulfuric and phosphoric acids until a viscid syrup is obtained, drawing the syrup into a filament, removing therefrom the acid, and hardening, substantially as described.

2. The hereinbefore-described method of producing non-inflammable artificial silk from cellulose and other analogous carbohydrates, which consists in purifying the said material, subjecting the purified material to the action of phosphosulfuric, sulfuric and phosphoric acids until a viscid syrup is obtained, increasing the stability of the syrup by treating it with an ethyl ester or its described equivalents, drawing the said syrup into a filament, removing therefrom the acid, and hardening, substantially as described.

3. The herein-described composition for making non-inflammable silk, which consists of a solution of purified cellulose in sulfuric and phosphoric acids mixed with an ethyl ester or its described equivalent, substantially as described.

In testimony that I claim the foregoing as my invention I have signed my name in presence of two subscribing witnesses.

RUDOLF LANGHANS.

Witnesses:
W. HAUPT,
L. A. EDWARDS.